United States Patent [19]

Kita et al.

[11] Patent Number: 4,512,615
[45] Date of Patent: Apr. 23, 1985

[54] BRAKE CONTROLLER

[75] Inventors: Yasuo Kita; Michio Moriya, both of Itami; Kenichi Yoshida, Osaka, all of Japan

[73] Assignee: Sumitomo Electric Industries, Ltd., Japan

[21] Appl. No.: 513,679

[22] Filed: Jul. 14, 1983

[30] Foreign Application Priority Data

Jul. 21, 1982 [JP] Japan .................. 57-128737
Jul. 21, 1982 [JP] Japan .................. 57-128738

[51] Int. Cl.³ .............................................. B60T 8/12
[52] U.S. Cl. ...................................... 303/97; 303/106; 364/426
[58] Field of Search ............... 188/181 A; 303/20, 97, 303/99, 100, 101, 103, 104, 105, 106; 364/426

[56] References Cited

U.S. PATENT DOCUMENTS 4,094,555 6/1978 Byrne et al. .................. 303/97 X
4,414,630 11/1983 Harris et al. .................. 303/104 X Primary Examiner—Duane A. Reger
Attorney, Agent, or Firm—Harness, Dickey & Pierce

[57] ABSTRACT

A vehicle brake controller provided with an electronic data processor to keep uniform the relationship between the pedal effort and the effectiveness of the brake independently of the change in various driving conditions. Data processor stores an optimum relationship, processes the signals from the sensors, computes a desired deceleration and gives a control signal to the control valve so that the actual deceleration will be equal to the desired deceleration.

12 Claims, 6 Drawing Figures

BRAKE CONTROLLER

The present invention relates to a brake controller for controlling the brakes of a vehicle and particularly to a brake controller provided with an electronic data processor.

Conventional vehicle brake controllers are of such a construction that the fluid pressure acting on the brakes depends only upon the force with which the brake pedal is stepped by the driver. Under almost unladen state, a large deceleration is obtained with a relatively small pedal effort as shown by line (1) in the graph of FIG. 2 while under the fully laden state the same deceleration is obtained only with a much larger pedal effort. In other words, the conventional brake controller was of such a construction that the brake works differently under different driving conditions such as the number of passengers, the weight of load, the gradient of the road and the coefficient of friction of brake components. Therefore, the driver had to adjust the pedal effort according to such driving conditions. For safe driving the driver had to be skilled in adjusting the pedal effort.

An object of the present invention is to provide a brake controller which keeps uniform the relationship between the pedal effort and the effectiveness of the brake independently of the change in the driving conditions, thereby eliminating the need of skill in operating the brake pedal and assuring safe driving.

In accordance with the present invention, a desired relationship between the pedal effort, i.e. the force F applied to a brake control means such as a brake pedal and the resultant deceleration $\beta$ (e.g. shown by line (2) in the graph of FIG. 2) is stored as the basic data in an electronic data processor such as a microprocessor, and the pedal effort and the actual deceleration obtained are detected in each instant during braking and compared wih the stored data. The output of the actuator is automatically controlled so that the relationship between the pedal effort and the deceleration will be as close to the stored desired relationship as possible.

Another problem in such a brake control results from the fact that there is necessarily some time delay (of the order of 0.02–0.05 second) between the rise of the actuator pressure and the occurrence of deceleration. If the pedal effort is increased sharply, the desired deceleration will increase accordingly beyond the actual deceleration so that the actuator pressure will be increased. But the actual deceleration will not follow instantly, but only after the abovesaid delay time. Therefore, the brake controller judges the actual deceleration insufficient and increases the actuator pressure further. After the delay time passed, an excessive deceleration will occur by the effect of the excessively increased actuator pressure. This causes hunting in the brake system.

Another object of the present invention is, therefore, to provide a brake controller which works satisfactorily even with the presence of some time delay between the development of the actuator pressure and the occurrence of the deceleration.

In accordance with the present invention, in order to solve the second problem, instead of comparing the actual deceleration detected with the desired deceleration, a deceleration value estimated from the stored data regarding the relationship between the actuator output and the deceleration actually obtained is compared with the desired deceleration, and if there is any difference therebetween, a control signal is given from the data processor to the actuator to eliminate such a difference. In other words, the actual deceleration is not used because of time delay, but an estimated deceleration value is used for comparison with the desired deceleration, the estimated deceleration being the one which is estimated from the stored data to occur after some delay time.

Various driving conditions affecting the effectiveness of the brake such as the number of passengers do not change so frequently. Therefore, a satisfactory effectiveness of the brake for brake control at present would be obtained by using the braking data in the not-so-distant past, e.g. the data at the last braking or the mean values for the last several brakings, or the data just ago in the present braking. Preferably, the decelerations should be stored which correspond to stable stepping forces (which do not vary for a longer period of time (e.g. 0.1–0.5 sec) than the delay time (i.e. 0.02–0.05 sec), and a mean value from such decelerations should be used for comparison. Such data should be always renewed and the up-to-date data should be used for comparison.

Now, suppose that the actuator pressure is $P_{n-1}$ at some point in the past and the deceleration then is $\beta_{n-1}$ and that they are proportional to each other, the relationship between them is expressed as follows:

$$\beta_{n-1} = b(P_{n-1})$$

wherein b is a constant, as shown in FIG. 6.

The relationship is stored in a data processor. At each braking, the deceleration that will be obtained $\beta_n$ can be estimated by use of the stored data from the actuator output $P_n$ detected as follows:

$$\beta_n = bP_n$$

On the other hand, a desired relationship between the pedal effort F and the deceleration $\beta$ is predetermined (as shown by line (3) in the graph of FIG. 2) as follows:

$$\beta = aF (a: constant)$$

The desired relationship, too, is stored in the data processor. By use of the stored data, a desired deceleration $\beta_n$ corresponding to a given pedal effort $F_n$ can be computed immediately. Therefore, the desired deceleration is obtained by controlling the actuator pressure so that the estimated deceleration $\beta''_n$ will be equal to the desired deceleration $\beta_n$. This means that it is obtained by controlling the actuator output P by means of the data processor so that $$P_n = (a/b)F_n$$

Although the above description is based on the assumption that there are simple proportional relationships between $\beta$ and P and between $\beta$ and F, the same is true even if there is any functional relationship between them.

In accordance with the present invention, a substantially uniform deceleration can be obtained for a given pedal effort applied to the brake pedal independently of change in the driving conditions such as the number of passengers, the weight of load, and the gradient of road.

In accordance with the present invention, time delay between the generation of brake fluid pressure and the occurrence of the desired deceleration does not have a mal effect on the brake control.

Other objects and features of the present invention will become apparent from the following description taken with reference to the accompanying drawings, in which.

Figure 1:
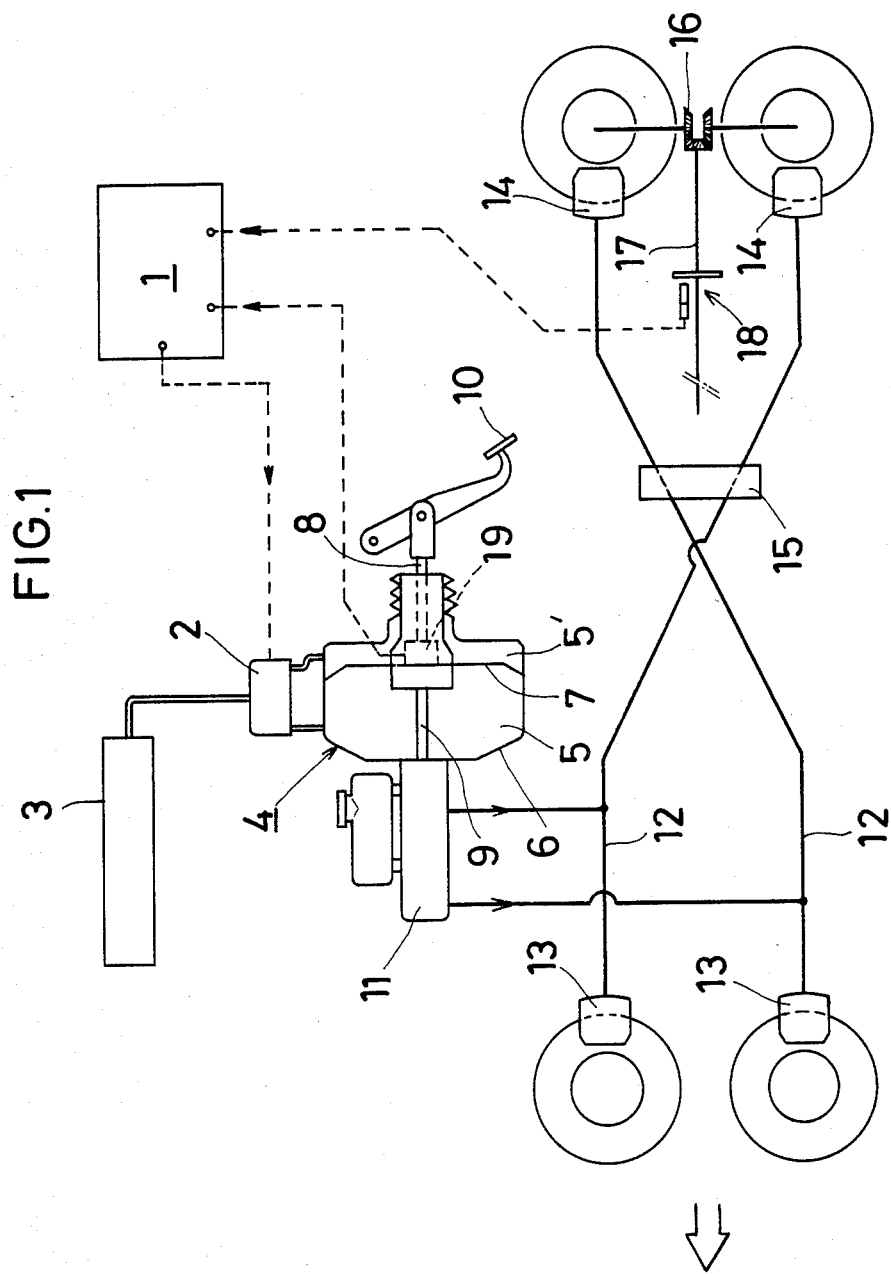
FIG. 1 is a block diagram of the first embodiment of the present invention.

Referring to FIG. 1, the brake controller according to the present invention includes a microprocessor 1 to the output side of which a control valve 2 is connected. A source of pressure 3 such as hydraulic, pneumatic or vacuum pressure is connected to the input of the control valve 2. Its output is connected to pressure chambers 5, 5' of an actuator 4 through two lines. The actuator 4 has a casing 6 and a piston 7 contained in the casing. An input shaft 8 and an output shaft 9 are coupled to the piston 7. A brake pedal 10 is connected to the input shaft 8, and a master cylinder 11 is connected to the output shaft 9. The output pressure of the master cylinder 11 is applied directly to front wheel brakes 13 through two brake lines 12, and through a proportioning valve 15 to rear wheel brakes 14.

A propeller shaft 17 coupled to a differential gear 16 for the rear wheels is provided with a speed sensor 18 which generates pulses proportional in number to the speed of rotation of the propeller shaft. The signal of the speed sensor is given to the microprocessor 1, in which the vehicle speed determined from the number of pulses is differentiated to determine the change in the vehicle speed, that is, the rate of deceleration.

The deceleration may be detected in any other ways, e.g. by detecting the inertia force acting on a weight carried on the vehicle.

The brake control input given by a driver, that is, the force applied to the brake pedal 10 when the driver steps it is detected by a sensor 19 such as a load cell mounted between the input shaft 8 and the piston 7 of the actuator 4. The output of the sensor 19, too, is given to the microprocessor 1.

Figure 2:
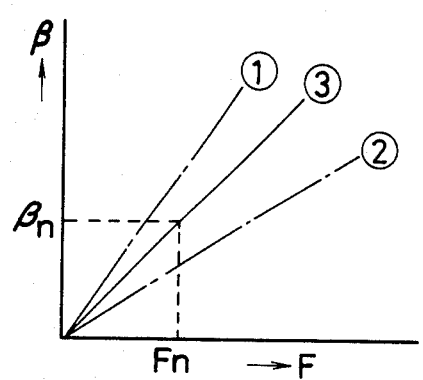
FIG. 2 is a graph showing the relationship between the pedal effort F and the deceleration $\beta$.

Now, let us assume that the line (3) in FIG. 2 represents a desired relationship between the pedal effort F and the deceleration $\beta$. The relation data is given to the microprocessor 1 and stored therein. The term "data processor" used in this invention is to be construed to cover a microprocessor, a processor, a microcomputer and a computer. It should have the following functions:

(1) determining the desired deceleration $\beta_n$ corresponding to the pedal effort $F_n$ detected by the sensor 19 on basis of the stored data, (2) comparing the actual deceleration $\beta_n'$ detected by the speed sensor 18 (or by detecting the inertia force acting on the weight) with the desired deceleration $\beta_n$, (3) giving to the control valve 2 such a signal as to actuate the control valve so that the actual deceleration $\beta_n'$ will be equal to the desired deceleration $\beta_n$, (4) performing these functions according to a predetermined program.

Thus, the brake controller according to the present invention ensures that the brake will work stably and independently of change in various conditions e.g. the number of persons in the car.

Every man has his own taste or feeling as to the effectiveness of a brake (expressed by $\beta_n/F_n$ in FIG. 2). Generally, a weak-armed man tends to prefer to higher $\beta_n/F_n$ ratio. For a strong-armed man, if the $\beta_n/F_n$ ratio is high, fine brake adjustment would be difficult. With the brake controller of the present invention, the effectiveness of the brake can be adjusted to the taste of the driver because the optimum deceleration pedal effort relationship to be stored (line (3) in FIG. 2) in the microprocessor is freely adjustable.

Figure 3:
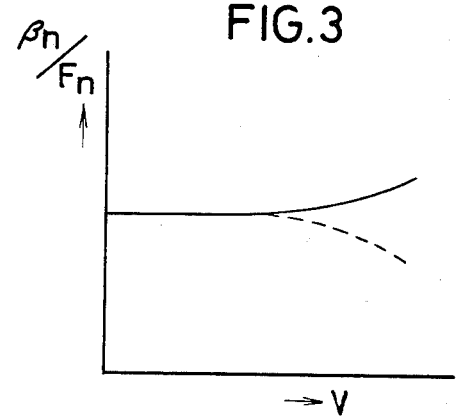
FIG. 3 is a graph showing the relationship between the vehicle speed V and $\beta_n/F_n$.

In driving at high speed, the driver sometimes feels the brake poorly effective though he feels the same brake normally effective in driving at low speed. This is because the car runs for a longer distance in a short time in braking from high speed. This problem can be solved e.g. by programming so that the $\beta_n/F_n$ radio will vary with the speed V detected by the speed sensor 18 as shown in the graph of FIG. 3 by solid and dotted lines. This ensures that the driver feels the effectiveness of the brake constant.

Figure 4:
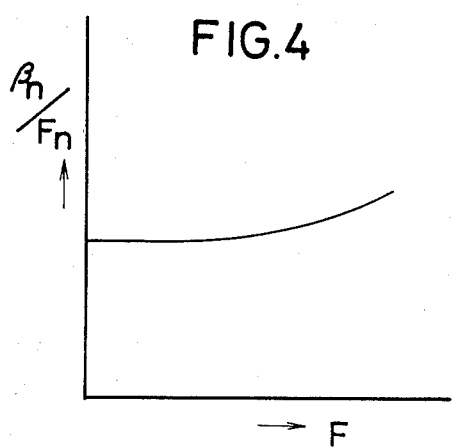
FIG. 4 is a graph showing the relationship between the effort F and $\beta_n/F_n$.

Another problem is that if the deceleration varies in proportion to the pedal effort ($\beta_n/F_n$=constant), the driver sometimes feels the brake poorly effective in the high pedal effort range. One solution to this problem is to program so that the $\beta_n/F_n$ value will increase in the high F range as shown in the graph of FIG. 4.

Figure 5:
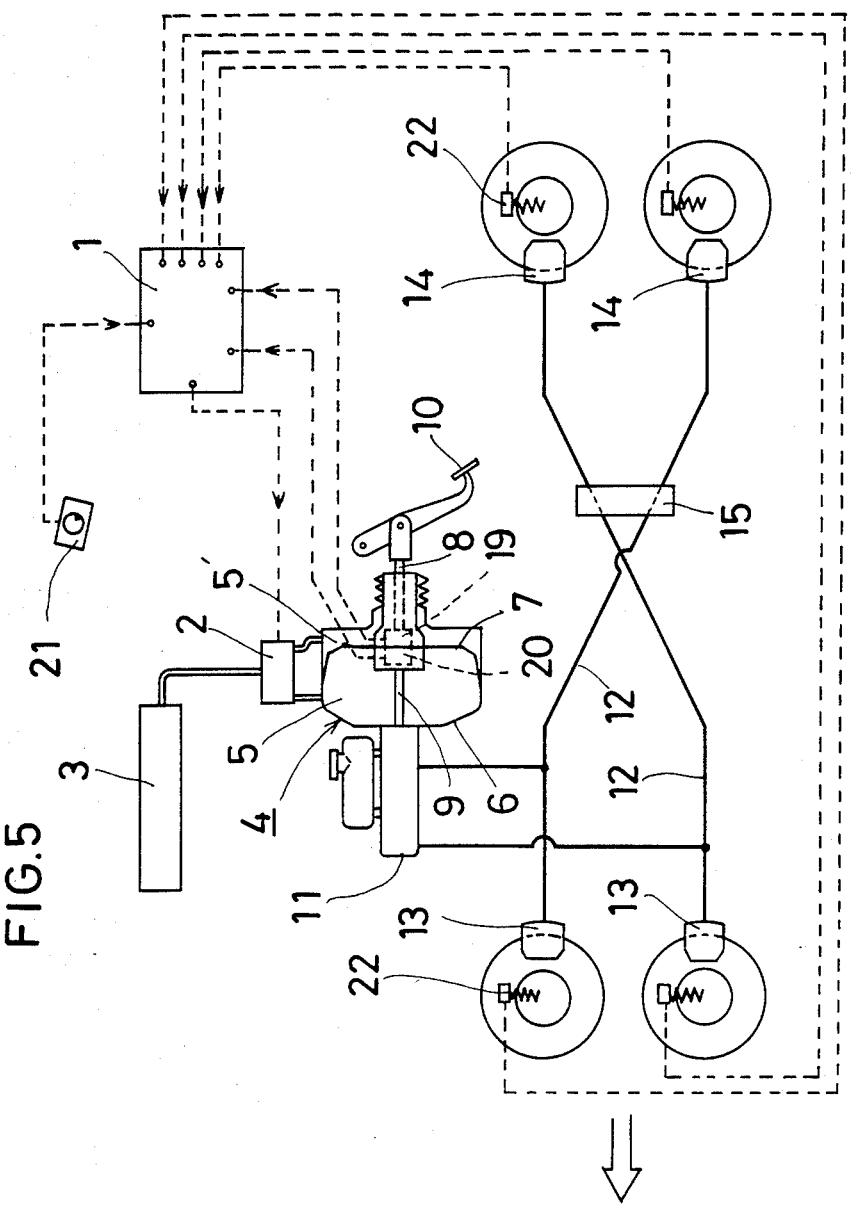
FIG. 5 is a block diagram of the second embodiment.

Next, the second embodiment will be described with reference to FIG. 5.

The second embodiment is substantially the same as the first embodiment except that:

(1) Besides the sensor 19 for the pedal effort, a sensor 20 for detecting the output of the actuator is provided between the piston 7 and the output shaft 9 of the actuator. The output of the sensor 20 is given to the microprocessor 1.

(2) A sensor 21 is provided to detect the deceleration in terms of the inertia force acting on a weight in the car. The output of the sensor 21 is given to the microprocessor 1.

(3) The speed sensor 18 in the first embodiment is not provided.

(4) A weight sensor 22 is provided on each wheel. Their outputs are given to the microprocessor 1.

In operation, the optimum relationship between the deceleration $\beta$ and the pedal effort F is set and stored in the microprocessor 1 as in the first embodiment.

Figure 6:
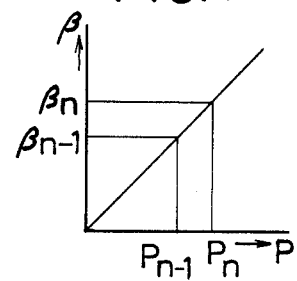
FIG. 6 is a graph showing the relationship between the actuator output P and the deceleration $\beta$.

The signal from the actuator output sensor 20 and the signal from the deceleration sensor 21 are given to the microprocessor 1 to store therein the relationship between the actuator output P and the deceleration $\beta$ on a time series basis as shown in FIG. 6. Thus the P vs. $\beta$ relationship at several points of time in the past is stored in the microprocessor 1.

When the driver steps the brake pedal 10, the actuator output $P_n$ is detected by the sensor 20 and given to the microprocessor 1, which estimates the deceleration $\beta''_n$ on the basis of the stored data, that is, the actuator output $P_{n-1}$ and the corresponding deceleration $\beta_{n-1}$ that actually occurred at some point of time in the past e.g. at the last braking.

On the other hand, the pedal effort $F_n$ will be detected by the sensor 19 and given to the microprocessor 1, which determines the desired deceleration $\beta_n$ corresponding to the detected pedal effort $F_n$ on the basis of the stored data, gives such a signal to the control valve 2 to actuate it so that the above-mentioned estimated deceleration $\beta''_n$ will come close to the desired deceleration $\beta_n$, and thereby controls the output $P_n$ of the actuator 4.

The possibility that the driving conditions change from some point of time to the present time is the smaller, the shorter the length of time therebetween. Such changes in the driving conditions generally offer no problem if the time is short. However, any change in the condition having a great effect on the effectiveness of the brake such as the change in the gross vehicle weight due to change in the number of passengers can be taken into consideration. For this purpose, the brake control data stored in the microprocessor 1 can be changed according to the result of detection by the weight sensors 22.

What are claimed are:

1. A brake controller for controlling a vehicle brake system having a plurality of brakes, a source of pressure, an actuator for controlling the pressure to be supplied to said brakes, and brake control means for operating said brake system, said brake controller comprising:

a control valve means interposed between said source of pressure and said actuator for controlling the pressure supplied from said source of pressure to said actuator;

a first sensing means for sensing the deceleration obtained by braking;

a second sensing means for sensing the force with which said brake control means is operated; and data processing means for storing data representing a desired relationship between the deceleration and said force, processing the signals from said first and second sensing means to compute a desired deceleration corresponding to said force sensed on the basis of the stored data, and giving such a control signal to said control valve means that the actual deceleration will be equal to the desired deceleration.

2. The brake controller as claimed in claim 1, wherein said actuator comprises a master cylinder and a brake booster, said brake booster being actuated by said source of pressure and said brake control means.

3. The brake controller as claimed in claim 2, wherein said second sensing means is incorporated in said actuator.

4. The brake controller as claimed in claim 1, further comprising a third sensing means for sensing the output of said actuator and giving a signal proportional to said output to said data processing means, which stores, as well as the data representing a desired relationship between the deceleration and said force, data about the signals from said first and third sensing means on a time series basis, estimates the deceleration corresponding to the actuator output at present by use of the latter data, and gives such a control signal to said control valve means so that the estimated deceleration will be equal to the desired deceleration corresponding to said force at present.

5. The brake controller as claimed in claim 1 wherein said first sensing means is adapted to sense a deceleration in terms of an inertia force acting on a weight carried on the vehicle.

6. The brake controller as claimed in claim 4, further comprising a fourth sensing means for sensing the gross weight of the vehicle, the signal from said fourth sensing means being given to said data processing means.

7. The brake controller as claimed in claim 2, wherein said first sensing means is adapted to sense a deceleration in terms of an inertia force acting on a weight carried on the vehicle.

8. The brake controller as claimed in claim 7, further comprising a fourth sensing means for sensing the gross weight of the vehicle, the signal from said fourth sensing means being given to said data processing means.

9. The brake controller as claimed in claim 3, wherein said first sensing is adapted to sense a deceleration in terms of an inertia force acting on a weight carried on the vehicle.

10. The brake controller as claimed in claim 9, further comprising a fourth sensing means for sensing the gross weight of the vehicle, the signal from said fourth sensing means being given to said data processing means.

11. The brake controller as claimed in claim 4, wherein said first sensing means is adapted to sense a deceleration in terms of an inertia force acting on a weight carried on the vehicle.

12. The brake controller as claimed in claim 11, further comprising a fourth sensing means for sensing the gross weight of the vehicle, the signal from said fourth sensing means being given to said data processing means.

* * * * *

UNITED STATES PATENT AND TRADEMARK OFFICE
CERTIFICATE OF CORRECTION

PATENT NO. : 4,512,615
DATED : April 23, 1985
INVENTOR(S) : Yasuo Kita, Michio Moriya and Kenichi Yoshida It is certified that error appears in the above-identified patent and that said Letters Patent is hereby corrected as shown below:

Column 1, line 38, "wih" should be --with--.

Column 4, line 22, "radio" should be --ratio--.

Column 6, line 34, Claim 9, line 2, after "sensing", insert --means--.

Signed and Sealed this

Third Day of December 1985

[SEAL]

Attest:

DONALD J. QUIGG

Attesting Officer    Commissioner of Patents and Trademarks